US012689035B2

(12) United States Patent
Kang et al.

(10) Patent No.: US 12,689,035 B2
(45) Date of Patent: Jul. 21, 2026

(54) CATHODE ACTIVE MATERIAL

(71) Applicant: KOREA UNIVERSITY RESEARCH AND BUSINESS FOUNDATION, Seoul (KR)

(72) Inventors: Yong-Mook Kang, Seoul (KR); Suwon Lee, Seoul (KR); Youngju Choi, Seoul (KR); Gi-Hyeok Lee, Cheonan-si (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 850 days.

(21) Appl. No.: 17/570,170

(22) Filed: Jan. 6, 2022

(65) Prior Publication Data

US 2022/0223870 A1 Jul. 14, 2022

(30) Foreign Application Priority Data

Jan. 8, 2021 (KR) ........................ 10-2021-0002623

(51) Int. Cl.
*H01M 4/60* (2006.01)
*H01M 4/139* (2010.01)
*H01M 10/052* (2010.01)

(52) U.S. Cl.
CPC ............. *H01M 4/60* (2013.01); *H01M 4/139* (2013.01); *H01M 10/052* (2013.01)

(58) Field of Classification Search
CPC ....... H01M 4/60; H01M 4/139; H01M 10/052
See application file for complete search history.

(56) References Cited

U.S. PATENT DOCUMENTS

2015/0004486 A1* 1/2015 Moroishi .......... H01M 10/0525
252/182.1
2018/0183039 A1* 6/2018 Koga ................ H01M 10/0525

FOREIGN PATENT DOCUMENTS

| CN | 110615480 A | 12/2019 | |
|----|-------------|---------|---|
| JP | 2003-502256 A | 1/2003 | |
| JP | 2019032954 A * | 2/2019 | ............. Y02E 60/10 |
| KR | 10-2013-0098224 A | 9/2013 | |
| KR | 10-2016-0022103 A | 2/2016 | |
| KR | 10-2018-0089030 A | 8/2018 | |
| KR | 10-2020-0013200 A | 2/2020 | |
| KR | 10-2112405 B1 | 5/2020 | |
| KR | 10-2120272 B1 | 6/2020 | |
| KR | 10-2021-0098611 A | 8/2021 | |

OTHER PUBLICATIONS

Machine Translation—JP2019032954A (Year: 2019).*
Luksic et al., Incorporating technetium in minerals and other solids: A review, Journal of Nuclear Materials, vol. 466, 2015, pp. 526-538, ISSN 0022-3115, https://doi.org/10.1016/j.jnucmat.2015.08.052. (https://www.sciencedirect.com/science/article/pii/S0022311515301884)) (Year: 2015).*
Mi Ru Jo et al., "Triggered reversible phase transformation between layered and spinel structure in manganese-based layered compounds," Nature Communications, Sep. 2, 2019, vol. 10, Article No. 3385.

* cited by examiner

*Primary Examiner* — Ula C Ruddock
*Assistant Examiner* — Christina Renee Daulton
(74) *Attorney, Agent, or Firm* — Hauptman Ham, LLP

(57) ABSTRACT

The inventive concept discloses a cathode active material containing an organic molecule containing oxygen and a transition metal-based metal oxide.

4 Claims, 9 Drawing Sheets

FIG. 1

| | |
|---|---|
| Mn | |
| Me | |
| O | |
| H | |

CATHODE ACTIVE MATERIAL

STATEMENT REGARDING GOVERNMENT SPONSORED RESEARCH OR DEVELOPMENT

The inventive concept is derived from research conducted as part of personal basic research (Ministry of Science and ICT) (R&D) (Project Identification Number: 1711111832, Research Management Institution: National Research Foundation of Korea, Research Project Title: Search and research on new electrode material based on complementary complex method and anion oxidation/reduction, Host Institution: Korea University Industry-University Cooperation Foundation, Research Period: 2020.03.01~2021.02.28, Contribution Rate: 1/2) of the Ministry of Science and ICT.

In addition, the inventive concept is derived from research conducted as part of Future Material Discovery (R&D) (Project Identification Number: 1711121529, Research Management Institution: National Research Foundation of Korea, Research Project Title: Development of 3D cathode for metal-air battery with maximized reaction interface based on digital twin technology, Host Institution: Korea University Industry-University Cooperation Foundation, Research Period: 2020.08.31~2024.12.31, Contribution Rate: 1/2) of the Ministry of Science and ICT.

There is no property interest of the Korean government in any aspect of this invention.

CROSS-REFERENCE TO RELATED APPLICATIONS

A claim for priority under 35 U.S.C. § 119 is made to Korean Patent Application No. 10-2021-0002623 filed on Jan. 8, 2021, in the Korean Intellectual Property Office, the entire contents of which are hereby incorporated by reference.

BACKGROUND

Embodiments of the inventive concept described herein relate to a cathode active material.

Batteries are devices that stores electrical energy in a form of chemical energy. Among them, a secondary battery has reversible charging/discharging characteristics, and includes an electrode, an electrolyte, and a separator.

Among them, the electrode that mainly contributes to an electrochemical characteristic of the secondary battery is composed of an anode and a cathode, and contains an active material for electrochemical activity.

Among various types of the secondary batteries, a lithium secondary battery containing a lithium-based material as a cathode active material has high energy density, no memory effect, and low self-discharge, so that the lithium secondary battery is widely utilized as an energy storage device for a portable electronic device.

However, as devices, such as an electric vehicle, requiring various electrochemical characteristics such as an energy density, a lifespan, and the like higher than those of existing device requiring energy storage appear, research on an electrode active material superior to $LiCoO_2$ and carbon-based graphite, which were commercialized as cathode and anode active materials, is being actively conducted.

SUMMARY

Embodiments of the inventive concept provide a cathode active material that exhibits excellent capacity and lifespan characteristics by making a structural change that appears during charging/discharging to be reversible.

In one example, the technical problems to be achieved in the inventive concept are not limited to the technical problems mentioned above. Other technical problems not mentioned will be clearly understood by those of ordinary skill in the art to which the inventive concept belongs from a following description.

According to an exemplary embodiment, a cathode active material contains an organic molecule containing oxygen and a transition metal oxide, the cathode active material includes a first crystal phase having a two-dimensional crystal structure and a second crystal phase having a three-dimensional crystal structure, the first crystal phase is a thermodynamically stable two-dimensional layered crystal structure where a unit lattice structure composed of the transition metal oxide, and having transition metal filling octahedral sites of a unit lattice where transition metal and oxygen (O) are bonded to each other is two-dimensionally extended, and the second crystal phase is a thermodynamically metastable three-dimensional crystal structure where, as some transition metal in the transition metal oxide forming the layered structure is chemically bonded to oxygen in the organic molecule, the unit lattice structure having transition metal filling the octahedral sites of the unit lattice and a unit lattice structure having transition metal filling tetrahedral sites are mixed.

The two-dimensional crystal structure may include two or more unit layers composed of the transition metal oxide, and contain at least one metal element disposed between the two or more unit layers and selected from a group of metals other than transition metal.

The cathode active material may be expressed by a following [Chemical Formula 1].

$$Me_xAO_2 \cdot yOC \qquad \text{[Chemical Formula 1]}$$

in Chemical Formula 1, the Me is at least one metal element selected from a group consisting of an alkali metal element and an alkaline earth metal element, wherein the OC is at least one organic molecule composed of an ether group (R—O—R') containing oxygen, A is transition metal, and $0.23 \leq x \leq 1$, and $0.01 \leq y \leq 0.5$.

The Me may be at least one element selected from Li, Na, K, Ca, and Mg.

The organic molecule may be at least one element selected from glycol ether (e.g., DEGDME) and dialkyl ether.

According to another exemplary embodiment, a method for preparing a cathode active material includes (A) synthesizing a Me (metal)-transition metal oxide containing crystal water between layers using a transition metal precursor, and (B) reacting the Me-transition metal oxide with an organic solvent composed of an ether group (R—O—R') to perform ion-exchange of the crystal water with an organic molecule (OC).

According to another exemplary embodiment, a method for preparing a cathode active material includes (C) reacting a transition metal precursor and a Me (metal) precursor with an organic solvent to synthesize an organic molecule in a manner to be stabilized between layers of a transition metal oxide.

The transition metal precursor may be formed as a precursor containing Me, the step (A) may include synthesizing a Me manganese oxide using a hydrothermal synthesis in distilled water or a microwave process of the transition metal precursor.

The transition metal precursor may include a manganese precursor, the manganese precursor may be formed as a Mn(II) precursor, and the step (A) may include mixing the manganese precursor, an ethylenediamine tetraacetic acid (EDTA) disodium salt, and distilled water with each other to form a mixture, and then, adding a Me aqueous solution to the mixture to synthesize a Me manganese oxide.

The step (A) may include reacting the Me-transition metal oxide, as a precursor, with a Me' solution to synthesize a Me'-transition metal oxide.

The Me' may be a metal different from the Me.

The step (B) may include reacting the Me or Me'-transition metal oxide with the organic solvent composed of the ether group (R—O—R) to perform the ion-exchange of the crystal water with the organic molecule (OC).

The cathode active material prepared in the step (B) may be expressed by a following [Chemical Formula 1].

$$Me_xAO_2 \cdot yOC \qquad \text{[Chemical Formula 1]}$$

in Chemical Formula 1, the Me is at least one metal element selected from a group consisting of an alkali metal element and an alkaline earth metal element, wherein the OC is at least one organic molecule composed of the ether group (R—O—R) containing oxygen, A is transition metal, and $0.23 \leq x \leq 1$, and $0.01 \leq y \leq 0.5$.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 1 is an exemplary diagram showing two different crystal structures in a cathode active material according to an embodiment of the inventive concept;

FIG. 2 shows a charging state, and FIG. 3 shows a discharging state;

DETAILED DESCRIPTION

Figure 2:
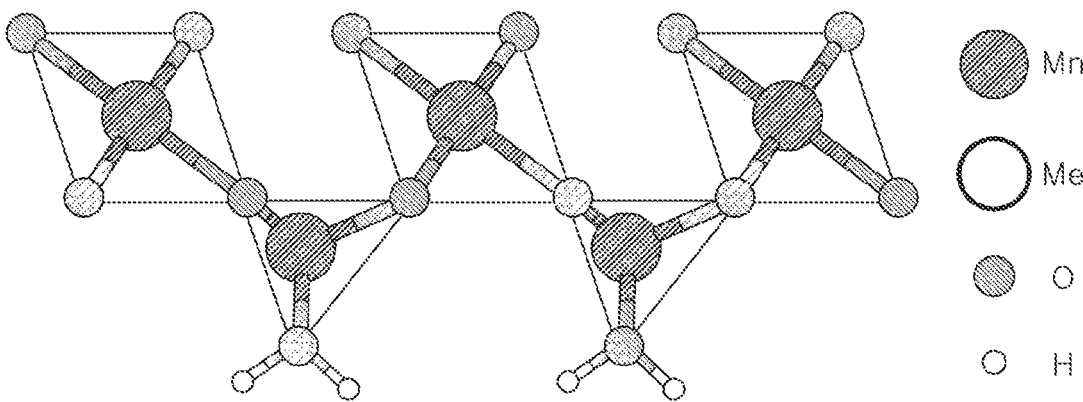
FIGS. 2 and 3 are exemplary views showing a crystal structure change during charging/discharging of a cathode active material according to an embodiment of the inventive concept.

Hereinafter, embodiments of the inventive concept will be described in more detail with reference to the accompanying drawings. The embodiments of the inventive concept may be modified in various forms, and the scope of the inventive concept should not be construed as being limited to the following embodiments. The present embodiment is provided to more completely describe the inventive concept to those of ordinary skill in the art. Accordingly, shapes of elements in the drawings are exaggerated to emphasize a clearer description.

Components of the inventive concept for clarifying solutions to the problems to be solved by the inventive concept will be described in detail with reference to the accompanying drawings based on preferred embodiments of the inventive concept. In assigning reference numerals to the components of the drawings, the same reference numbers are given to the same components even when the components are in different drawings. It should be noted in advance that components of other drawings may be cited when necessary in the description of the corresponding drawing.

Among various kinds of cathode active materials, a layered structure-based material is being actively studied in recent years because the layered structure-based material is able to achieve a high energy density required in a field such as an electric vehicle with a high theoretical capacity and an average voltage thereof. However, the high theoretical capacity, which is an advantage of the layered structure-based material, has been considered an unattainable goal due to an irreversible structural change or the like that occurs when an amount of desorption of alkali ions increases. An existing solution is to replace a transition metal, which is a center of oxidation/reduction, or to delay the irreversible structural change through doping of a metal element with high affinity for oxygen.

In general, the layered structure-based cathode active material is composed of an alkali metal (Li, Na, K, and the like) layer as a charge transfer medium and a transition metal oxide layer. In this connection, when the alkali metal in the transition metal oxide layer escapes at a rate equal to or higher than a certain rate, a layered structure is not able to be maintained thermodynamically, and thus, the structure is changed. The structure formed as such is thermodynamically more stable than the existing layered structure, so that the structure has irreversibility of not being able to be returned to the existing layered structure.

Such irreversible structural change is not able to be completely prevented even with the above solution. Therefore, it has been considered impossible to fully utilize the high theoretical capacity of the layered structure-based material.

The inventive concept is to induce a reversible structural change using an organic molecule inserted into a manganese-based metal oxide layer to realize an electrochemical characteristic close to the theoretical capacity of the layered structure-based material and maximize charging/discharging reversibility.

Figure 1:
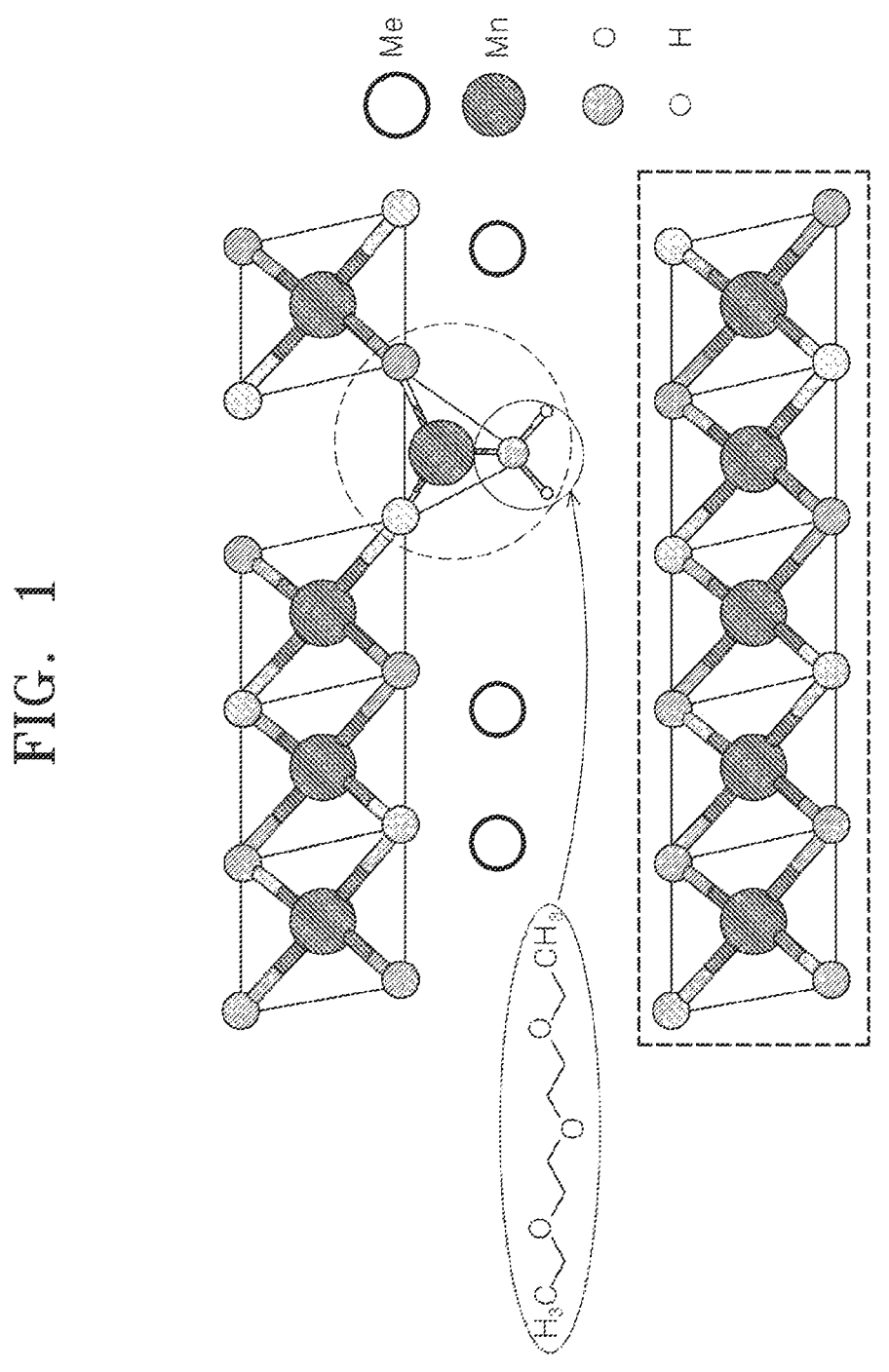

In the following, with reference to FIGS. 1 to 3 together, a cathode active material, which is prepared according to an embodiment of the inventive concept, exhibits a two-dimensional layered crystal structure, and is a birnessite, will be described.

FIG. 1 is an exemplary diagram showing two different crystal structures in a cathode active material according to an embodiment of the inventive concept. FIGS. 2 and 3 are exemplary views showing a crystal structure change during charging/discharging of a cathode active material according to an embodiment of the inventive concept, FIG. 2 shows a charging state, and FIG. 3 shows a discharging state.

The cathode active material according to an embodiment of the inventive concept is a manganese-based metal oxide containing the organic molecule, and is able to exhibit a reversible phase transition of returning to an original structure during discharging as a structural change to a metastable phase instead of a stable phase is induced by the organic molecule properly contained in the crystal structure before the irreversible structural change occurs completely.

The corresponding cathode active material may contain the organic molecule and the manganese-based metal oxide. As shown in FIG. 1, the manganese-based metal oxide may have a two-dimensional crystal structure (a dotted square portion in FIG. 1) in which a unit lattice structure in which manganese (Mn) and oxygen (O) are bonded to each other is extended two-dimensionally, and may have a three-dimensional crystal structure (a dotted circle portion in FIG. 1) as manganese (Mn) in the manganese-based metal oxide is bonded with oxygen (O) in the organic molecule.

Hereinafter, in one embodiment, for convenience, a phase having the two-dimensional crystal structure is referred to as a first crystal phase, and a phase having the three-dimensional crystal structure is referred to as a second crystal phase.

First, the first crystal phase has the two-dimensional crystal structure (a layered crystal structure) composed of the manganese-based metal oxide. In one embodiment, in the unit lattice of the two-dimensional crystal structure, the manganese fills octahedral sites of the unit lattice.

The two-dimensional crystal structure may again include two or more unit layers made of a manganese oxide, and may contain at least one metal element (Me) disposed between the two or more unit layers and selected from a group of metals other than the manganese.

The metal element (Me) other than the manganese may be repeatedly inserted into or desorbed from a space between the two or more unit layers during a charging/discharging process to repeatedly oxidize/reduce the manganese (Mn). Specifically, in the discharging process of the cathode active material according to an embodiment, the metal element (Me) other than the manganese may be inserted into the space between the unit layers. In addition, in the charging process of the cathode active material, the metal element (Me) other than the manganese may be desorbed from the space between the unit layers.

That is, the metal element (Me) other than the manganese serves to induce electrochemical activity of the manganese (Mn) while going in and out of the space between the two or more unit layers.

In one embodiment, examples of the metal element (Me) other than the manganese may include an alkali metal element, an alkaline earth metal element, or a combination thereof. However, the metal element (Me) other than the manganese according to an embodiment may not be necessarily limited thereto, and may include other typical elements or transition elements that may contribute to the electrochemical activity of the manganese (Mn) in the space between the two or more unit layers.

In one embodiment, the organic molecule may be further disposed between the two or more unit layers. That is, the organic molecule may be disposed between the two or more unit layers together with the metal element (Me) other than the manganese.

The organic molecule may contain oxygen, and may be composed of at least one element selected from glycol ether (e.g., DEGDME) and dialkyl ether.

In one example, the organic molecule may exist between the two or more unit layers. Unlike the metal elements (Me) other than the manganese, the organic molecule may remain in the space between the two or more unit layers without being desorbed. Accordingly, even when the metal element (Me) other than the manganese is repeatedly inserted into or desorbed from the space between the two or more unit layers, an arrangement of the unit layers may be continuously maintained without collapsing.

In one example, the organic molecule according to an embodiment may contain oxygen and form the chemical bonding with the manganese (Mn) as described above. In one embodiment, the chemical bonding between the organic molecule and the manganese may proceed reversibly based on the charging/discharging. Specifically, in the charging process of the cathode active material according to an embodiment, bonding between the manganese (Mn) and oxygen constituting the unit layer is broken, and the metal element (Me) other than the manganese is desorbed out of the unit layer. In this connection, the manganese (Mn) whose bonding is broken is bonded with the oxygen in the organic molecule to form the three-dimensional crystal structure.

On the other hand, in the discharging process of the cathode active material, the bonding between the oxygen of the organic molecule and the manganese (Mn) is broken, and the manganese (Mn) whose bonding is broken is recombined with the oxygen constituting the unit layer.

That is, in one embodiment, the second crystal structure forming reaction by the bonding between the oxygen in the organic molecule and the manganese and the first crystal structure forming reaction by the bonding between the oxygen constituting the unit layer and the manganese (Mn) may be in a mutually reversible relationship.

The phenomenon in which the formation reactions of the first crystal structure and the second crystal structure are mutually reversible as described above is resulted from a difference in thermodynamic stability between the bonding between the oxygen in the organic molecule and the manganese (Mn) and the bonding between the oxygen constituting the unit layer and the manganese (Mn).

In one embodiment, the first crystal phase formed through the bonding between the oxygen constituting the unit layer and the manganese (Mn) is a thermodynamically stable phase. However, the second crystal phase formed through the bonding between the oxygen in the organic molecule and the manganese (Mn) is a thermodynamically metastable phase.

Accordingly, in the cathode active material according to an embodiment, the first crystal phase, which is the stable phase, may be changed to the second crystal phase, which is the metastable phase, by external energy in a charging state, and the second crystal phase, which is the metastable phase, may be changed to the first crystal phase, which is the stable phase in a discharging state.

In one embodiment, the second crystal phase has the three-dimensional crystal structure as described above, and is the thermodynamically metastable phase.

When the second crystal phase is included within the above range in an initial state of the cathode active material according to an embodiment, even when the number (cycles) of charging/discharging of the cathode active material is increased, the reversible phase transition relationship between the first crystal phase and the second crystal phase may be maintained.

The second crystal phase according to an embodiment may have the three-dimensional crystal structure as described above. In a unit lattice of the three-dimensional crystal structure, the manganese may fill octahedral sites and tetrahedral sites of the unit lattice. That is, the number of bonding with the oxygen of the manganese in the unit lattice of the two-dimensional crystal structure and the manganese in the unit lattice of the three-dimensional crystal structure may be different.

In one embodiment, an arrangement relationship of the manganese and the oxygen in the unit lattice of the three-dimensional crystal structure is similar to that of a spinel crystal structure having the manganese as a central element. However, unlike the general spinel crystal structure having 6 oxygen atoms bonded to one manganese (Mn) atom, in the three-dimensional crystal structure according to an embodiment, 4 oxygen atoms may be bonded to one manganese (Mn) or 6 oxygen atoms may be bonded to one manganese (Mn) in the unit lattice.

The general spinel crystal structure is thermodynamically stable and exhibits irreversible characteristic. When the layered structure undergoes a phase transition to the thermodynamically stable spinel crystal structure during the charging, a content of the spinel crystal structure gradually increases by repeated charging/discharging. Because the spinel crystal structure has a lower theoretical capacity compared to the layered structure, a capacity and a lifespan of the cathode active material may be significantly reduced.

Therefore, a general cathode active material for a secondary battery not only should be adjusted not to contain a material having such a spinel crystal structure, but also should be adjusted such that the material having the spinel crystal structure is not formed in the repeated charging/discharging states.

In the general cathode active material for the secondary battery, the spinel crystal structure is formed in the process of charging to high voltage, so that the charging/discharging is performed by lowering the voltage to prevent the formation of the spinel crystal structure. As the charging/discharging driving is performed by lowering the voltage as such, it was inevitable to exhibit a lower capacity than the theoretical capacity of the cathode active material.

However, in the cathode active material according to an embodiment, because the first crystal phase and the second crystal phase have the mutually reversible phase transition relationship, even when the charging/discharging is repeated at the high voltage, excellent capacity characteristics close to the theoretical capacity and excellent lifespan characteristics may be exhibited at the same time through the reversible phase transition that forms the second crystal phase, which is the thermodynamically metastable phase, by bonding the manganese with the oxygen in the organic molecule.

In one example, the first crystal phase and the second crystal phase may be mixed in the cathode active material according to an embodiment, as shown in FIG. 1. However, because the first crystal phase and the second crystal phase have different dimensions, even when the first crystal phase and the second crystal phase are mixed in the cathode active material, an overall microstructure may be different depending on contents of the first crystal phase and the second crystal phase.

That is, when one region of the cathode active material is selected, a microstructure in the corresponding region exhibits a microstructure corresponding to a crystal phase having a higher content among the first crystal phase and the second crystal phase.

The cathode active material is synthesized through oxidation and reduction of a manganese precursor. Various methods such as microwave, hydrothermal, and room temperature synthesis are used, and an oxidation/reduction agent, a hydrogen concentration index, and a chelating agent the required are required in each synthesis environment are used.

Figure 3:
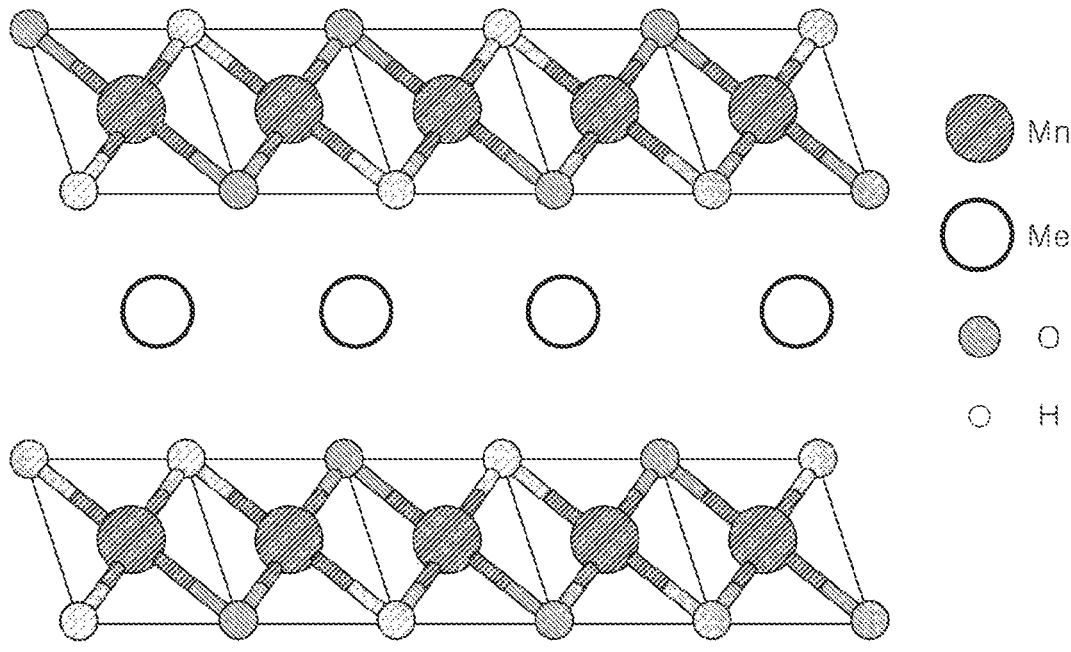

In addition, referring to FIGS. 2 and 3, the cathode active material according to FIG. 1 is in the initial state without being charged/discharged. In the cathode active material according to an embodiment, as the charging and the discharging are performed once, the internal crystal structure is sequentially changed in an order of FIGS. 1, 2, and 3.

In addition, when the charging/discharging is repeated for the cathode active material whose discharging has been completed, the cathode active material becomes to exhibit the internal crystal structures in FIGS. 2 and 3 repeatedly.

Referring to FIG. 2 first, in the charging state of the cathode active material according to an embodiment, the first crystal phase is reduced and the second crystal phase is formed. Specifically, in the charging state of the cathode active material, at least some of the manganese (Mn) in the manganese-based metal oxide migrates from the two-dimensional layered crystal structure and becomes somewhat thermodynamically unstable compared to the two-dimensional layered crystal structure, and a reaction in which the migrated manganese (Mn) is combined with the oxygen (O) in the organic molecule predominantly proceeds. Therefore, as the charging proceeds, the content of the second crystal phase in the cathode active material gradually increases.

On the other hand, referring to FIG. 3, in the discharging state of the cathode active material according to an embodiment, the second crystal phase is reduced and the first crystal phase is formed. Specifically, in the discharging state of the cathode active material, a reaction in which the bonding between the manganese (Mn) in the manganese-based metal oxide and the oxygen (O) in the organic molecule is broken predominantly proceeds. As the migrated manganese (Mn) becomes to be thermodynamically stable again, the migrated manganese (Mn) is bonded with the oxygen constituting the unit layer to form the two-dimensional layered crystal structure. Therefore, as the discharging progresses, the content of the first crystal phase in the cathode active material gradually increases.

As such, in the cathode active material according to an embodiment, the first crystal phase, which is the thermodynamically stable phase, and the second crystal phase, which is the thermodynamically metastable phase, have the mutually reversible phase transition relationship, so that even when the charging/discharging is repeated, the excellent capacity characteristics close to the theoretical capacity and the excellent lifespan characteristics may be realized at the same time.

Hereinafter, a secondary battery containing a cathode active material according to an embodiment of the inventive concept will be described with reference to FIG. 4.

Figure 4:
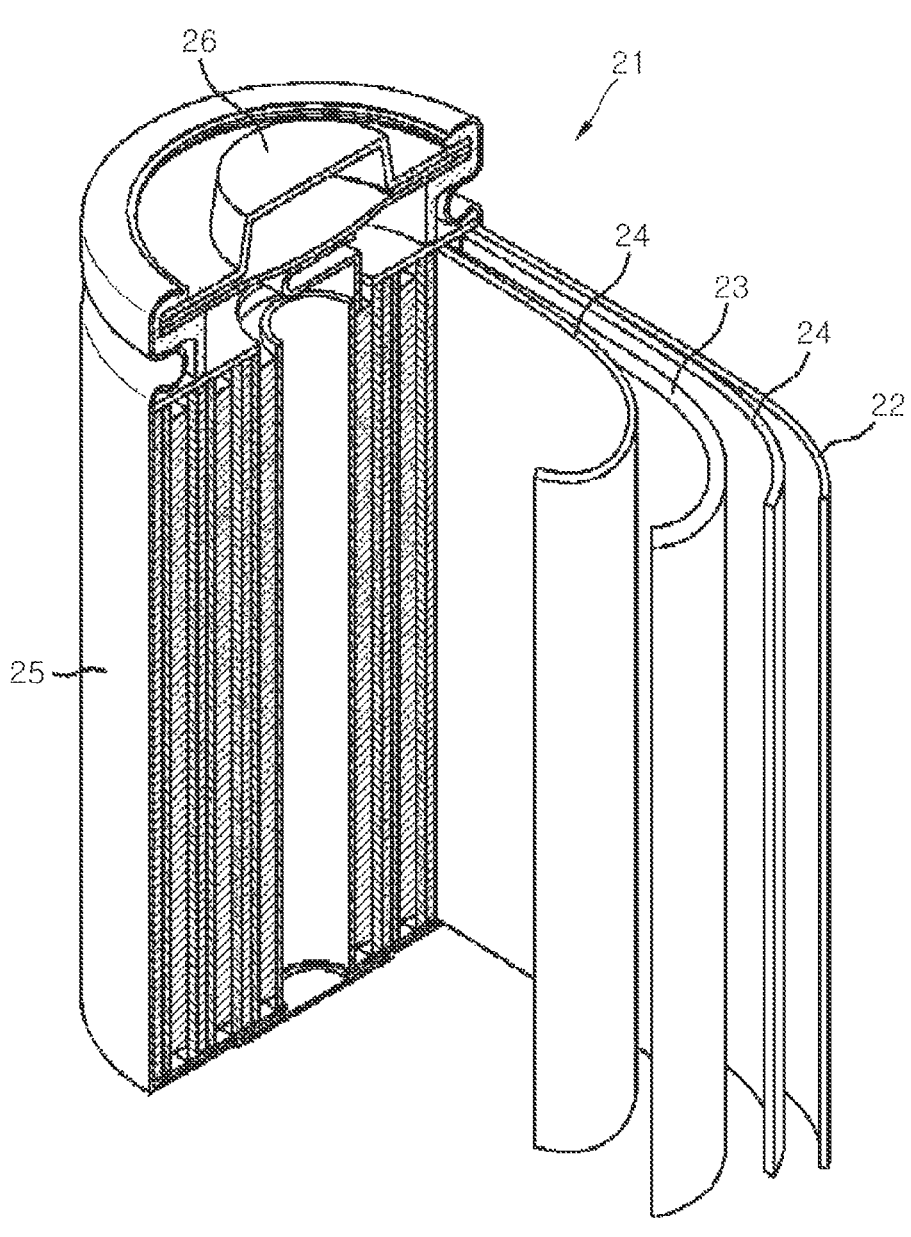
FIG. 4 is a view showing a secondary battery containing a cathode active material according to an embodiment of the inventive concept.

FIG. 4 is a view showing a secondary battery containing a cathode active material according to an embodiment of the inventive concept.

A secondary battery 21 according to FIG. 4 includes a cathode 23 containing the cathode active material according to an embodiment, an anode 22, and a separator 24 containing an electrolyte.

The cathode 23 and the anode 22 are manufactured by coating and drying a composition for preparing a cathode active material layer and a composition for preparing a cathode active material layer on a current collector, respectively.

The composition for preparing the cathode active material is prepared by mixing the cathode active material, a conductive agent, a binder, and a solvent with each other. As the cathode active material, the cathode active material according to the above-described embodiment is used.

In one example, the secondary battery 21 according to FIG. 4 merely relates to the secondary battery structure containing the cathode active material according to the inventive concept, and the inventive concept is not limited thereto. A specific implementation detail will be described later through a following implementation process.

In one example, in an embodiment of the inventive concept, the manganese-based oxide has been described, but this is only a specific embodiment, and the inventive concept is able to be a cathode active material containing a transition metal-based oxide.

Example

Sodium Manganese Oxide Synthesis Method 1

A sodium manganese oxide is obtained by adding 2.5 ml of $NaMnO_4$ as a manganese precursor to 40 ml of distilled water and performing the hydrothermal synthesis or the microwave synthesis at 220° C. for 6 hours.

After washing the obtained sodium manganese oxide with the distilled water three times, residual moisture remaining on a surface is removed by drying the sodium manganese oxide at about 60° C. under vacuum for 24 hours.

Sodium Manganese Oxide Synthesis Method 2

8 mmol of $MnSO_4 \cdot H_2O$ as the manganese precursor is put into 25 ml of the distilled water together with 8 mmol of EDTA (Ethylenediamine tetraacetic acid) disodium salt and mixed. 1.2M NaOH aqueous solution is added to the mixed solution at a rate of 33 mL for each minute. After stirring the mixed solution for about 1 hour, the manganese-based oxide is obtained. After washing the obtained material with the distilled water three times, the residual moisture remaining on the surface is removed by drying the obtained material under the vacuum at about 60° C. for 24 hours.

[Organic Molecule Substitution]

About 0.1 g of a cathode active material having crystal water disposed between the layer structures synthesized using the above synthesis method is mixed with 1M $NaPF_6$ in EC:DEC (1:1 vol. %) solution and stirred for 24 hours.

The obtained manganese-based oxide (an organic-manganese-based oxide) into which the organic molecule is inserted is washed three times with ethanol and then dried under vacuum at about 60° C. for 24 hours to remove residual organic matter remaining on a surface of the manganese-based oxide.

Therefore, EC and DEC (Ethylene carbonate and diethyl carbonate) organic molecules may be inserted (substituted) instead of the crystal water. The corresponding process is shown in FIG. 1.

As the inserted carbonate-based organic molecule inserted replaces the existing crystal water, the organic-manganese-based oxide, like the crystal water-manganese-based oxide, may also exhibit excellent electrochemical characteristics based on the reversible structural change.

[Direct Synthesis of Manganese Oxide Containing Organic Molecule]

Synthesis is performed in a method of reacting the manganese precursor and a metal precursor with an organic solvent. This may synthesize the manganese oxide containing the organic molecule in a simpler scheme compared to the organic molecule substitution method described above, and may exhibit the excellent electrochemical characteristics based on the reversible structural change as described above.

The cathode active material of Example prepared through the above process has a composition expressed as $Na_{0.27}MnO_2 \cdot 0.54C_6H_{14}O_3$.

[Electrode and Battery Manufacturing]

[Electrode Manufacturing]

The composition for preparing the cathode active material is prepared by mixing the cathode active material, the conductive agent, the binder, and the solvent with each other. As the cathode active material, the cathode active material according to the above-described embodiment is used.

The binder, which is a component that assists in bonding of the active material and the conductive agent and bonding to the current collector, is added in an amount of 1 to 50 parts by weight based on 100 parts by weight of a total weight of the cathode active material. Non-limiting examples of such binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene ether polymer (EPDM), sulfonated EPDM, styrene butadiene rubber, fluororubber, various copolymers, and the like. A content thereof is 2 to 5 parts by weight based on 100 parts by weight of the total weight of the cathode active material. When the binder content is within the above range, a binding force of the active material layer to the current collector is good.

The conductive agent is not particularly limited as long as it has conductivity without causing a chemical change in the battery. For example, graphite such as natural graphite, artificial graphite, and the like, a carbon-based material such as carbon black, acetylene black, ketjen black, channel black, furnace black, lamp black, summer black, and the like, a conductive fiber such as a carbon fiber, a metal fiber, and the like, a carbon fluoride, a metal powder such as an aluminum powder, a nickel powder, and the like, a conductive whiskey such as a zinc oxide, a potassium titanate, and the like, a conductive metal oxide such as a titanium oxide and the like, a conductive material such as a polyphenylene derivative and the like may be used.

A content of the conductive agent is 1 to 10 parts by weight based on 100 parts by weight of the total weight of the cathode active material. When the content of the conductive agent is within the above range, a conductivity characteristic of the finally obtained electrode is excellent.

As a non-limiting example of the solvent, N-methylpyrrolidone and the like are used.

A content of the solvent is 1 to 10 parts by weight based on 100 parts by weight of the cathode active material. When the content of solvent is within the above range, a work for forming the active material layer becomes easy.

The cathode current collector has a thickness in a range from 3 to 500 μm, and is not particularly limited as long as it has high conductivity without causing the chemical change in the battery. For example, stainless steel, aluminum, nickel, titanium, heat-treated carbon, or aluminum or stainless steel subjected to a surface treatment with carbon, nickel, titanium, silver, and the like may be used. The current collector may increase an adhesion of the cathode active material by forming fine irregularities on a surface thereof, and may be in various forms, such as a film, a sheet, a foil, a net, a porous body, a foam, a nonwoven body, and the like.

In the present experiment, to manufacture the cathode, on an Al current collector, the cathode active material:the conductive agent:the binder are mixed with each other in a weight ratio of 8:1:1, and subjected to a heat treatment in a vacuum oven at 70° C. for 5 hours.

[Battery Manufacturing]

The 2032 coin type Li half cell is manufactured in the glove box.

The electrolyte according to an embodiment may be a non-aqueous electrolyte. In one embodiment, the non-aqueous electrolyte may be a metal salt-containing non-aqueous electrolyte.

The metal salt-containing non-aqueous electrolyte is composed of the non-aqueous electrolyte and the metal salt. As the non-aqueous electrolyte, a non-aqueous electrolyte, an organic solid electrolyte, an inorganic solid electrolyte, and the like are used. As a metal constituting the metal salt, at least one element selected from the alkali metal and the alkaline earth metal may be used. In one embodiment, the metal salt may be one selected from a lithium salt, a sodium salt, a magnesium salt, a potassium salt, and a calcium salt. In one embodiment, the metal salt may be one selected from the lithium salt and the sodium salt.

As the non-aqueous electrolyte, as non-limiting examples, N-methyl-2-pyrrolidinone, propylene carbonate, ethylene carbonate, butylene carbonate, dimethyl carbonate, diethyl carbonate, gamma-butyrolactone, 1,2-dimethoxyethane, 2-methyl tetrahydrofuran, dimethyl sulfoxide, 1,3-dioxolane, formamide, N,N-dimethylformamide, dioxolane, acetonitrile, nitromethane, methyl formate, methyl acetate, triester phosphate, trimethoxymethane, a dioxolane derivative, sulfolane, methyl sulfolane, 1,3-dimethyl-2-imidazole ridinone, a propylene carbonate derivative, a tetrahydrofuran derivative, and an aprotic organic solvent such as ether, methyl pyropionate, and ethyl propionate may be used.

As the organic solid electrolyte, as non-limiting examples, a polyethylene derivative, a polyethylene oxide derivative, a polypropylene oxide derivative, a phosphoric acid ester polymer, polyester sulfide, polyvinyl alcohol, polyvinylidene fluoride, and the like may be used.

As the inorganic solid electrolyte, as non-limiting examples, $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and the like may be used.

When the lithium salt is used as the metal salt, as a material that is good to dissolve in the non-aqueous electrolyte, as non-limiting examples, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlC_{14}$, $CH_3SO_3Li$, $CF_3SO_3Li$, $(CF_3SO_2)_2NLi$, lithium chloroborate, lithium lower aliphatic carboxylate, lithium tetraphenyl borate, imide, and the like may be used.

Example is the cathode active material containing the organic molecule and the manganese oxide, and Comparative Example is the cathode active material containing the crystal water and the manganese oxide.

Hereinafter, with reference to FIGS. 5 to 7, characteristics of the cathode active material and the secondary battery containing the cathode active material according to Example of the inventive concept will be described.

[Analysis Result]

Evaluation 1: Structural Change Based on Charging and Discharging of Cathode Active Material FIG. 5 is a graph showing a Raman spectrum based on charging/discharging of a cathode active material according to Example of the inventive concept.

Figure 5:
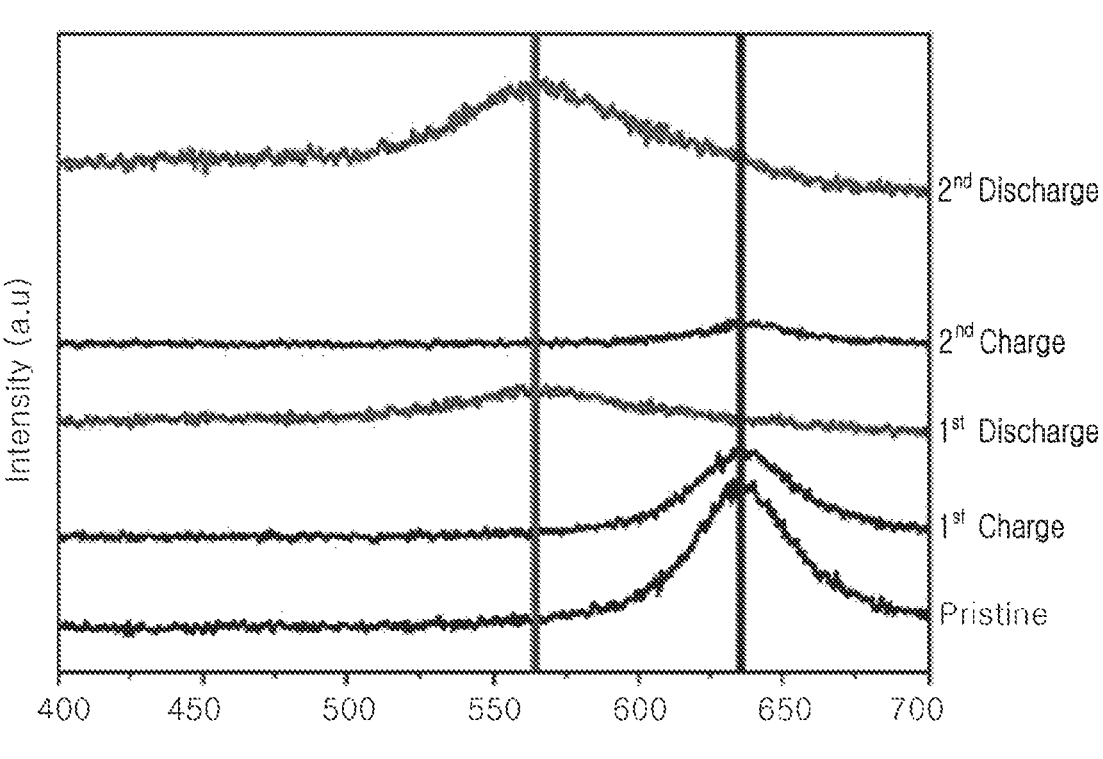
FIG. 5 is a graph showing a Raman spectrum based on charging/discharging of a cathode active material according to Example of the inventive concept.

Referring to FIG. 5, it may be seen that the cathode active material according to Example exhibits the crystal structure similar to the spinel in the charging state and exhibits the structure corresponding to the layered crystal structure in the discharging state.

FIG. 5 shows an ex situ Raman spectroscopy analysis result of Example. In spectra of a pristine and a charging electrode of Example, a peak at about 630 $cm^{-1}$ region is observed, which means formation of a spinel-like phase that appears when Mn undergoes tetracoordinate and hexacoordinate coordination. On the other hand, in the discharging process, a peak is observed around 570 $cm^{-1}$, which indicates a layered phase in which Mn is hexacoordinated.

From the result of FIG. 5, it may be seen that the first crystal phase and the second crystal phase of the cathode active material according to Example have the mutually reversible phase transition relationship based on the charging/discharging.

Evaluation 2: Comparison of Electrochemical Characteristics of Cathode Active Materials After performing the charging/discharging at the current density of 0.1 C in the voltage range from 1.5 V to 4.8 V for manufactured half cells of Example and Comparative Example, results of the 1st, 2nd, 10th, 30th, 50th, 70th, and 100th times are shown in FIGS. 6 and 7, respectively.

Figure 6:
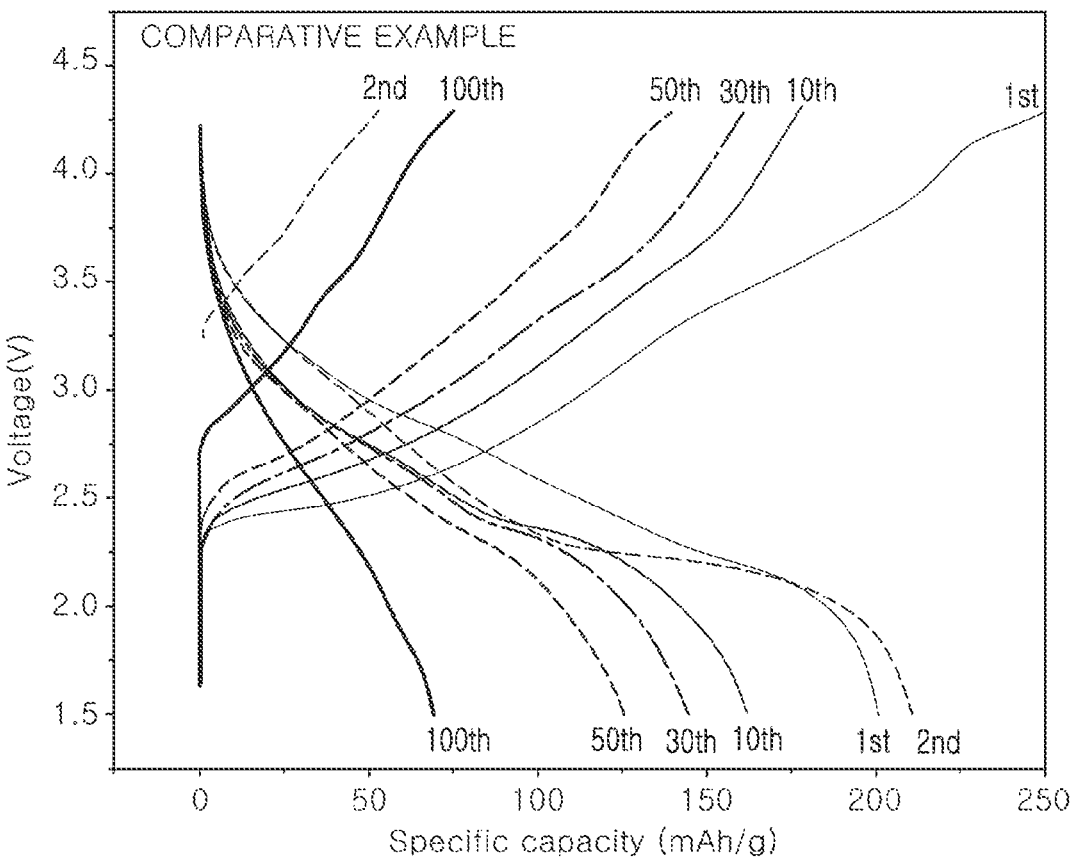
FIGS. 6 and 7 respectively show graphs of results of 1st, 2nd, 10th, 30th, 50th, 70th, and 100th times after performing charging/discharging at a current density of 0.1 C in a voltage range from 1.5 V to 4.3 V for half cells manufactured according to Example and Comparative Example.
Figure 7:
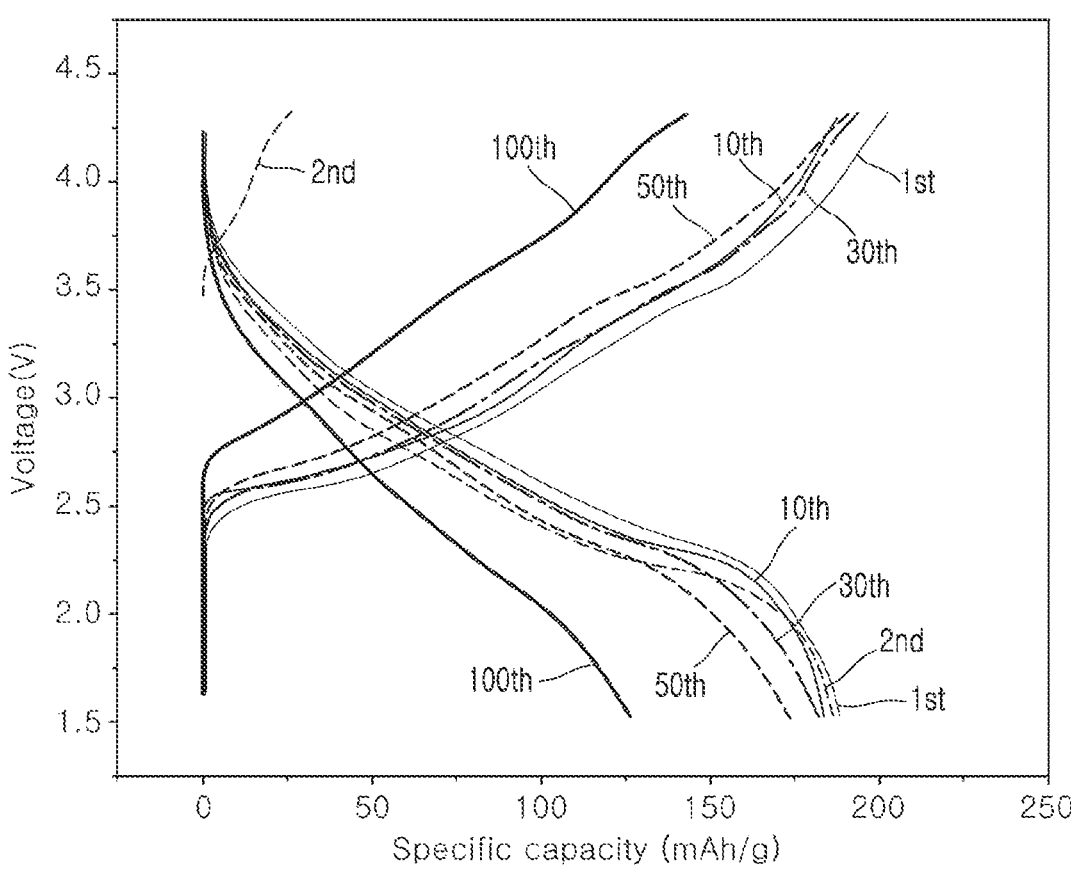

Referring to FIGS. 6 and 7, both the cathode active materials exhibited capacities of about 25 (Example) to 55 (Comparative Example) mAh/g when first charging was performed. In one example, it may be seen that the cathode active material according to Example exhibits a capacity of about 180 mAh/g, and the cathode active material according to Comparative Example exhibits a capacity of about 200 mAh/g when performing first discharging. However, when viewing the charging/discharging graphs after the 10th time, it may be seen that Example exhibits higher capacity than Comparative Example.

Figure 8:
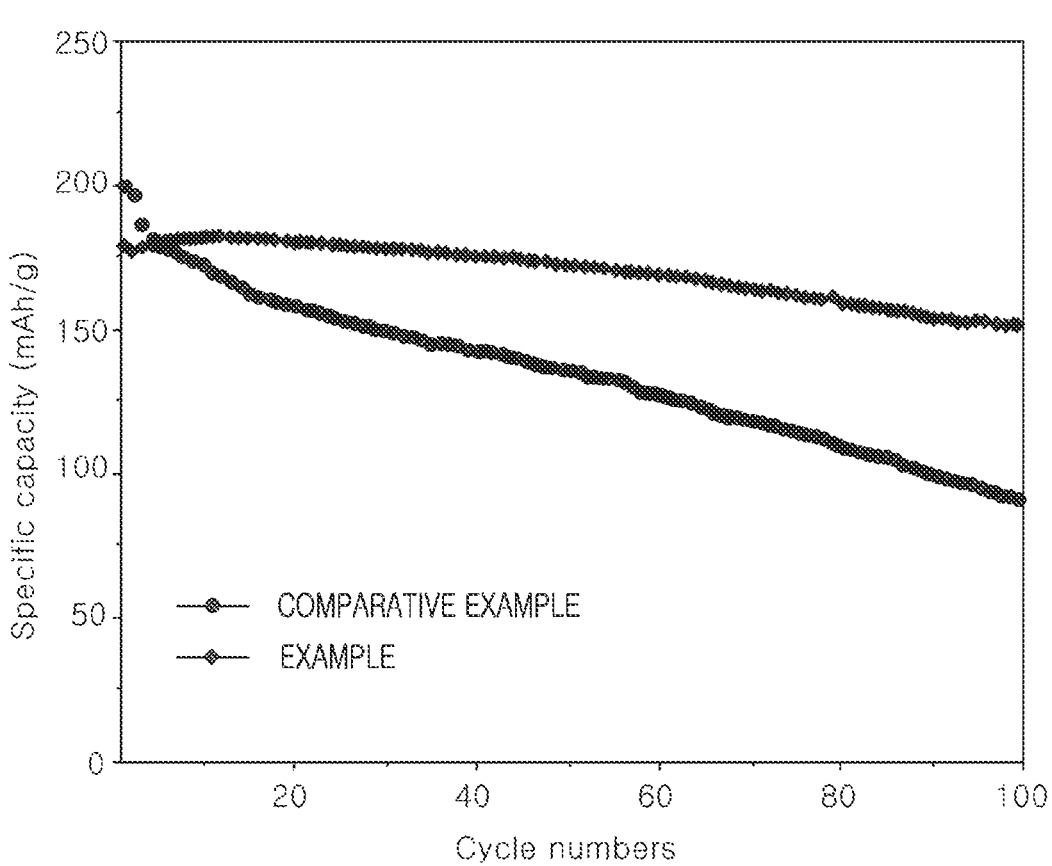
FIG. 8 is a graph showing cycle capacity characteristics of secondary batteries containing cathode active materials according to Example and Comparative Example of the inventive concept.

In addition, referring to FIG. 8, based on the 100th time, Example exhibits a discharging capacity of about 125 mAh/g, and Comparative Example exhibits a discharging capacity of about 70 mAh/g, which respectively represent capacity retention rates of 70% and 35% compared to the 1st time. Therefore, it may be seen that the organic-manganese oxide cathode material in which the crystal water is substituted with the organic molecule exhibits high capacity in the charging/discharging.

Evaluation 3: Organic Molecule Insertion Verification

Figure 9:
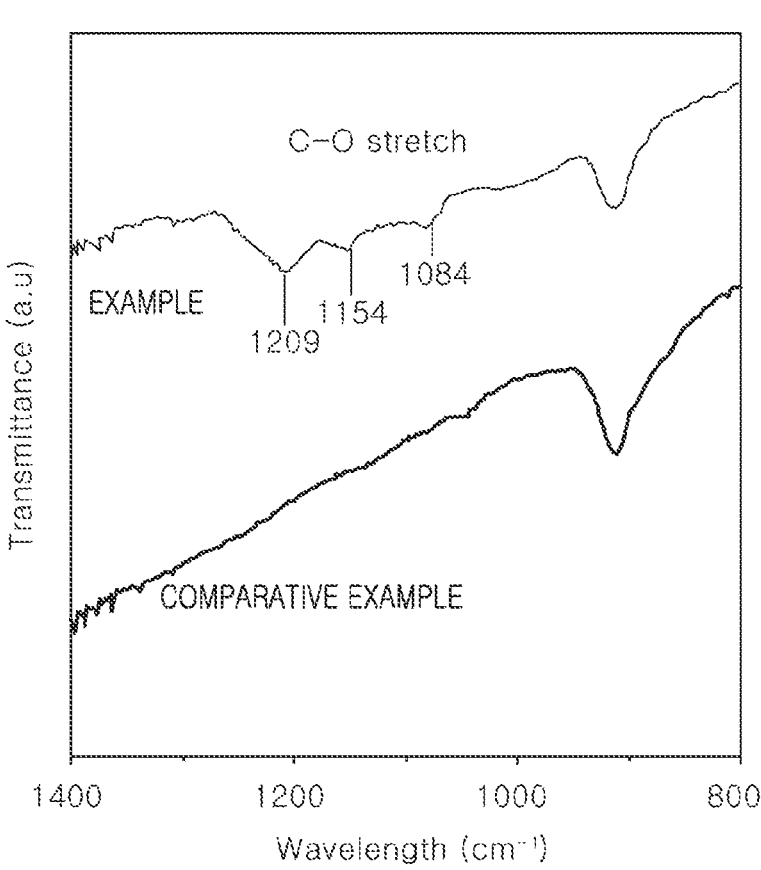
FIG. 9 is a graph showing results of analyzing Example and Comparative Example of the inventive concept through FT-IR (Fourier Transform Infrared Spectroscopy)

FIG. 9 shows results of analyzing Example and Comparative Example through FT-IR (Fourier Transform Infrared Spectroscopy). Through the FT-IR analysis, binding of elements in a sample may be analyzed. Example that has undergone the organic molecule substitution process described above exhibits peaks resulted from C—O bonding stretching at 1209 $cm^{-1}$, 1154 $cm^{-1}$, and 1084 $cm^{-1}$.

Figure 10:
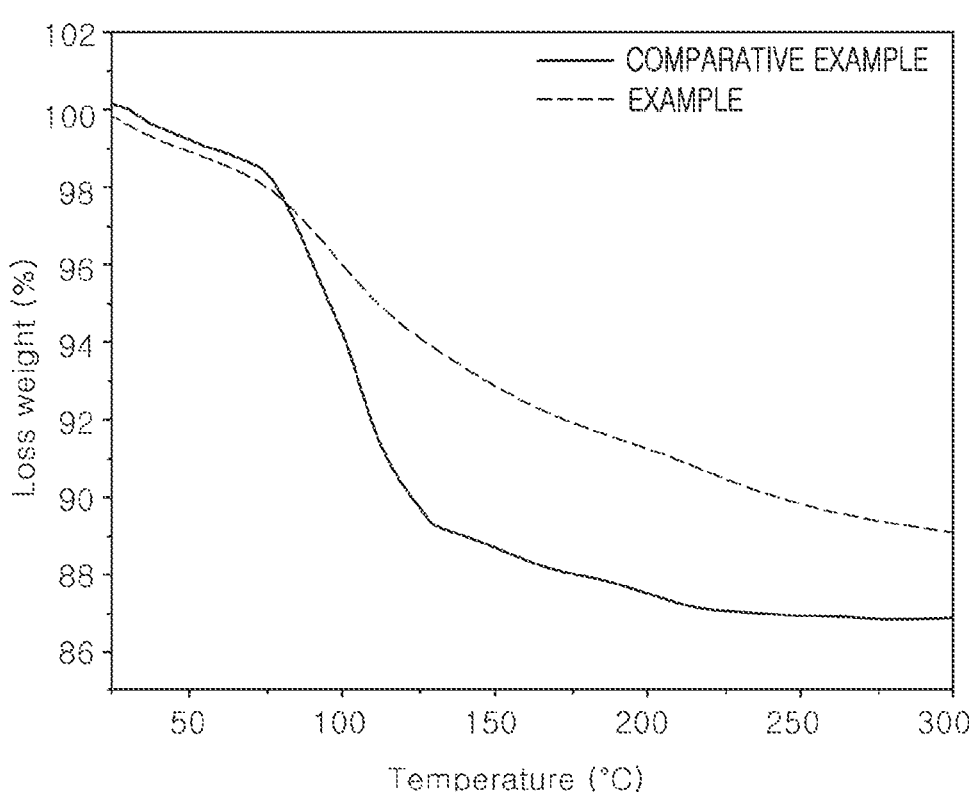
FIG. 10 is a graph showing results of analyzing Example and Comparative Example of the inventive concept through TGA (thermogravimetric analysis).

FIG. 10 shows results of analyzing Example and Comparative Example through TGA (thermogravimetric analysis). Through the TGA analysis, it may be seen that a mass decreases with an increase of a temperature. It may be seen that, in Example that has undergone the organic molecule substitution process described above, the crystal water escaped by seeing that the mass decrease is relatively small at a temperature equal to or higher than 100° C. where the crystal water starts to escape.

Through FIGS. 9 and 10, it was verified that the organic molecule was inserted instead of the crystal water in Example.

The above detailed description exemplifies the inventive concept. In addition, the above-mentioned content is to describe a preferred embodiment of the inventive concept, and the inventive concept is able to be used in various other combinations, modifications, and environments. That is, changes or modifications are possible within the scope of the concept of the inventive concept disclosed herein, the scope equivalent to the written disclosure, and/or within the scope of skill or knowledge in the art. The written embodiment is to describe the best state for implementing the technical idea of the inventive concept, and various changes thereof required in specific application fields and uses of the inventive concept are also possible. Therefore, the above detailed description of the inventive concept is not intended to limit the inventive concept to the disclosed embodiment. The appended claims should also be construed to include other embodiments as well.

According to embodiments of the inventive concept, it is possible to exhibit the excellent capacity and lifespan characteristics by making the structural change that appears during the charging/discharging to be reversible through the reaction with the inserted organic molecule.

In one example, effects that may be obtained from the inventive concept are not limited to the above-mentioned effects. Other effects not mentioned will be clearly understood by those of ordinary skill in the art to which the inventive concept belongs from a following description.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A cathode active material containing:

a transition metal oxide, having a two-dimensional layered crystal structure when being discharged and a three-dimensional crystal structure when being charged, wherein an organic molecule that is a glycol ether or a dialkyl ether is disposed between two or more unit layers of the two-dimensional layered crystal structure, and wherein when being charged, an oxygen of the organic molecule is bonded reversibly with a transition metal of the transition metal oxide to transform the two-dimensional layered crystal structure into the three-dimensional crystal structure, the two-dimensional layered crystal structure is thermodynamically stable, where a unit lattice of the transition metal oxide contains the transition metal and oxygen bonded with each other, and transition metal filling octahedral sites of the unit lattice is two-dimensionally extended, the three-dimensional crystal structure is thermodynamically metastable, where the unit lattice having the transition metal filling octahedral sites and a unit lattice having transition metal filling tetrahedral sites are mixed, and the cathode active material is expressed by a following Chemical Formula 1:

$$Me_xAO_2 \cdot yOC$$

wherein, in Chemical Formula 1,

Me is at least one metal element selected from a group consisting of an alkali metal element and an alkaline earth metal element, A is transition metal, OC is the glycol ether or the dialkyl ether, and $0.23 \leq x \leq 1$, and $0.01 \leq y \leq 0.5$.

2. The cathode active material of claim 1, wherein the two-dimensional crystal structure includes two or more unit layers composed of the transition metal oxide, and contains at least one metal element disposed between the two or more unit layers and selected from a group of metals other than transition metal.

3. The cathode active material of claim 1, wherein the Me is at least one element selected from Li, Na, K, Ca, and Mg.

4. A cathode active material containing:

a transition metal oxide, having a two-dimensional layered crystal structure when being discharged and a three-dimensional crystal structure when being charged, wherein an organic molecule is disposed between two or more unit layers of the two-dimensional layered crystal structure, and wherein when being charged, oxygen of the organic molecule is bonded reversibly with a transition metal of the transition metal oxide to transform the two-dimensional layered crystal structure into the three-dimensional crystal structure, the two-dimensional layered crystal structure is thermodynamically stable, where a unit lattice of the transition metal oxide contains the transition metal and oxygen bonded with each other, and transition metal filling octahedral sites of the unit lattice is two-dimensionally extended, the three-dimensional crystal structure is thermodynamically metastable, where the unit lattice having the transition metal filling octahedral sites and a unit lattice having transition metal filling tetrahedral sites are mixed, and the cathode active material has a composition $Na_{0.27}MnO_2 \cdot 0.54C_6H_{14}O_3$.

* * * * *